(12) United States Patent
Hu et al.

(10) Patent No.: US 11,486,805 B2
(45) Date of Patent: Nov. 1, 2022

(54) IMPACT TEST FIXTURE CAPABLE OF APPLYING PRELOAD ON COMPOSITE LAMINATE

(71) Applicant: Northwestern Polytechnical University, Shaanxi (CN)

(72) Inventors: Yuan Hu, Shaanxi (CN); Yaoyao Shi, Shaanxi (CN); Dongsheng Liu, Shaanxi (CN); Zhongxi Zhang, Shaanxi (CN)

(73) Assignee: NORTHWESTERN POLYTECHNICAL UNIVERSITY, Shaanxi (CN)

( * ) Notice: Subject to any disclaimer, the term of this patent is extended or adjusted under 35 U.S.C. 154(b) by 383 days.

(21) Appl. No.: 16/875,788

(22) Filed: May 15, 2020

(65) Prior Publication Data
US 2020/0371006 A1 Nov. 26, 2020

(30) Foreign Application Priority Data
May 24, 2019 (CN) .......................... 201910440403.0

(51) Int. Cl.
*G01N 3/00* (2006.01)
*G01N 3/303* (2006.01)
*G01N 3/02* (2006.01)

(52) U.S. Cl.
CPC .............. *G01N 3/303* (2013.01); *G01N 3/02* (2013.01); *G01N 2203/001* (2013.01); *G01N 2203/0014* (2013.01); *G01N 2203/0033* (2013.01)

(58) Field of Classification Search
CPC ............. G01N 3/303; G01N 2203/001; G01N 2203/0014; G01N 2203/0033
See application file for complete search history.

(56) References Cited

U.S. PATENT DOCUMENTS

| 4,125,251 | A | * | 11/1978 | Jamieson, Jr. | .......... B25B 5/006 269/45 |
| 4,632,375 | A | * | 12/1986 | Yang | ..................... B25B 1/2426 269/265 |
| 5,791,640 | A | * | 8/1998 | Webster | .................. B25B 5/061 269/287 |
| 5,836,574 | A | * | 11/1998 | Park | ........................ B25B 5/104 269/93 |
| 6,761,350 | B1 | * | 7/2004 | Webster | .................. B25B 1/103 269/287 |
| 2017/0130894 | A1 | * | 5/2017 | Kovacs | .................... F16B 2/065 |
| 2017/0252902 | A1 | * | 9/2017 | Boiteux | .................. B25B 5/087 |
| 2017/0361426 | A1 | * | 12/2017 | Chen | ......................... B25B 5/10 |

* cited by examiner

*Primary Examiner* — Max H Noori
(74) *Attorney, Agent, or Firm* — Crowell & Moring LLP; John C. Freeman

(57) ABSTRACT

An impact test fixture capable of applying preload on a composite laminate, which is composed of a base, a clamping mechanism and a loading mechanism, where the clamping mechanism is positioned on an upper surface of the base and fixedly connected to the base through a bolt, and the loading mechanism is installed at an end of the base. A composite laminate is placed in a rectangular groove of the base. A first wedge block and a second wedge block are positioned in a base sliding groove between a pressing block and a baffle plate, and inclined planes of the two wedge blocks are oppositely installed; the baffle plate is matched with the base through a first fixing bolt and a second fixing bolt, a loading bolt passes through a screw hole at a side end of the base and is matched with the first wedge block.

2 Claims, 1 Drawing Sheet

IMPACT TEST FIXTURE CAPABLE OF APPLYING PRELOAD ON COMPOSITE LAMINATE

CROSS-REFERENCE TO RELATED APPLICATION

This application claims priority to CN patent application number 201910440403.0, filed May 24, 2019, which is hereby incorporated by reference.

TECHNICAL FIELD

The present invention relates to the technical field of impact tests of composite laminates, and in particular, to an impact test fixture capable of applying preload on a composite laminate.

BACKGROUND

Carbon fiber reinforced polymer (CFRP) composite laminates are used extensively in aviation, aerospace and automotive industries, where advantage is taken of their superior corrosion resistance, specific strength and specific stiffness and so on. However, one of their most serious limitations is their response to localized impact loading such as that produced by a dropped tool. To test the impact damage resistance of composite laminates, drop weight impact test is adopted usually.

The size of the impact test fixture was specified in the Standard Test Method for Measuring the Damage Resistance of a Fiber-Reinforced Polymer Matrix Composite to a Drop-Weight Impact Event (ASTM D7136/D7136M-05) formulated by American Society for Testing and Materials (ASTM), but the fixture given in this standard cannot apply a preload to laminates during impact. However the composites structures of airframe are subjected to in-plane stress during in-service after assembly. Hence, the impact behavior of free boundary composite laminates cannot completely simulate the real situation. In order to more realistically obtain the impact damage resistance of the composite structure in practical applications, it is necessary to design an impact test fixture capable of applying a preload.

A preload application fixture was proposed in the existing published paper *Influence of Compressive Prestress on Impact Damage Resistance of Composite Laminates* (Journal of Composite Materials, 2016, 33(8): 1677-1686.). The fixture applies a preload to a test piece by tightening transverse bolts at both ends, and converts a transverse load into a longitudinal load to be applied to the end of the test piece through two wedge-shaped steel blocks in the fixture. However, tightening the bolts at both ends easily leads to asymmetric loads, resulting in uneven practical preload.

SUMMARY

In order to overcome the shortcoming that a standard fixture for an impact test of a composite laminate cannot apply a preload and solve the problem of asymmetric preload of the existing preload fixture, the present invention provides an impact test fixture capable of applying preload on a composite laminate. The fixture is implemented in a mode of clamping at one end and loading at the other end, which can not only ensure a stable function of clamping the composite laminate in the impact test, but also simultaneously apply uniform and symmetrical preloads, thus effectively solving the problem that the existing test device cannot accurately simulate the preload existing in the practical engineering application due to the assembly or operation process.

The technical solution adopted by the present invention for solving the technical problem is as follows: an impact test fixture capable of applying preload on a composite laminate, including a base, a clamping mechanism and a loading mechanism, where the clamping mechanism is positioned on an upper surface of the base and fixedly connected to the base through a bolt, and the loading mechanism is installed at an end of the base;

the base has a cuboid structure and is axially provided with a rectangular groove, an end of the base is provided with a sliding groove communicated with one end of the rectangular groove, the sliding groove and the rectangular groove are positioned coaxially, a pressing block is positioned in the sliding groove at the end of the base and matched with the sliding groove to slide, the base end close to both sides of the sliding groove is provided with axial screw holes that are matched with a first fixing bolt and a second fixing bolt to fix a baffle plate, the rectangular groove in the base is used for placing a composite laminate, the other end of the base is provided with screw holes which are matched with a first press bolt and a second press bolt to mount a pressing plate;

the clamping mechanism includes a first gasket, the pressing plate, the first press bolt, the second press bolt, a second gasket, the pressing block, a third press bolt, a fourth press bolt and a fifth press bolt, where the pressing plate is a rectangular flat plate, a lower side end of the pressing plate is provided with a transverse boss, the pressing plate is provided with symmetrical through holes, the pressing plate is connected to the base through the first press bolt and the second press bolt, the first gasket is positioned between the pressing plate and the base, and the second gasket is positioned between the pressing block and the composite laminate; the second gasket is used for ensuring that a pressing force is uniformly applied to an end of the composite laminate, a side end face of the pressing block is provided with a groove, threaded through holes are evenly distributed in an upper portion of the pressing block at the same side as the groove and used for clamping the end of the composite laminate, and the composite laminate is fixed on the base through the first press bolt, the second press bolt, the third press bolt, the fourth press bolt and the fifth press bolt;

the loading mechanism includes a loading bolt, a first wedge block, a second wedge block, the baffle plate, the first fixing bolt and the second fixing bolt, where the first wedge block and the second wedge block are positioned in the base sliding groove between the pressing block and the baffle plate, and inclined planes of the two wedge blocks are oppositely installed to ensure a large pressing force; the baffle plate is matched with the base through the first fixing bolt and the second fixing bolt, the loading bolt passes through the screw hole at the side end of the base and is matched with the first wedge block, and different preloads are applied to the composite laminate by rotating the loading bolt.

The first wedge block and the second wedge block have an identical structure, and inclined plane angles of the two wedge blocks are 10°.

Beneficial Effects

The impact test fixture capable of applying preload on a composite laminate according to the present invention is composed of a base, a clamping mechanism and a loading mechanism, where the clamping mechanism is positioned on an upper surface of the base and fixedly connected to the base through a bolt, and the loading mechanism is installed at an end of the base. A composite laminate is placed in a rectangular groove of the base. A first wedge block and a second wedge block are positioned in a sliding groove in the base between a pressing block and a baffle plate, and inclined planes of the two wedge blocks are oppositely installed to ensure a maximum pressing force; the baffle plate is matched with the base through a first fixing bolt and a second fixing bolt, a loading bolt passes through a screw hole at a side end of the base and is matched with the first wedge block, and different preloads are applied to the composite laminate by rotating the loading bolt. The impact test fixture can ensure a stable function of clamping the composite laminate in the impact test process and change the applied preload load by adjusting the tightening torque of the loading bolt.

The impact test fixture capable of applying preload on a composite laminate according to the present invention can uniformly and symmetrically apply preload load in the process of the drop weight impact test of a fiber reinforced resin matrix composite. The fixture special for an impact test is implemented in a mode of clamping at one end and loading at the other end. Loading is performed through the bolt, and the self-locking property of the bolt ensures that the applied preload load is stable, reliable and symmetrical. The fixture can easily change the applied preload load by adjusting the tightening torque of the loading bolt. The fixture has a simple structure and reliable action.

The present invention overcomes the shortcoming that the standard fixture for an impact test of the composite laminate cannot apply the preload, thus effectively solving the problem that the existing test device cannot accurately simulate the preload existing in the practical engineering application due to the assembly or operation process.

BRIEF DESCRIPTION OF THE DRAWINGS

An impact test fixture capable of applying preload on a composite laminate according to the present invention is further described in detail below with reference to accompanying drawings and implementations.

In the figure.

1. base 2. first gasket, 3. pressing plate, 4. first press bolt, 5. second press bolt, 6. composite laminate, 7. loading bolt, 8. third press bolt, 9. fourth press bolt, 10. fifth press bolt, 11. second gasket 12. pressing block, 13. first wedge block, 14. second wedge block, 15. baffle plate, 16. first fixing bolt, 17. second fixing bolt.

DETAILED DESCRIPTION

This example relates to an impact test fixture capable of applying preload on a composite laminate, which is suitable for clamping a composite laminate impact test piece on which preload needs to be applied.

Figure 1:
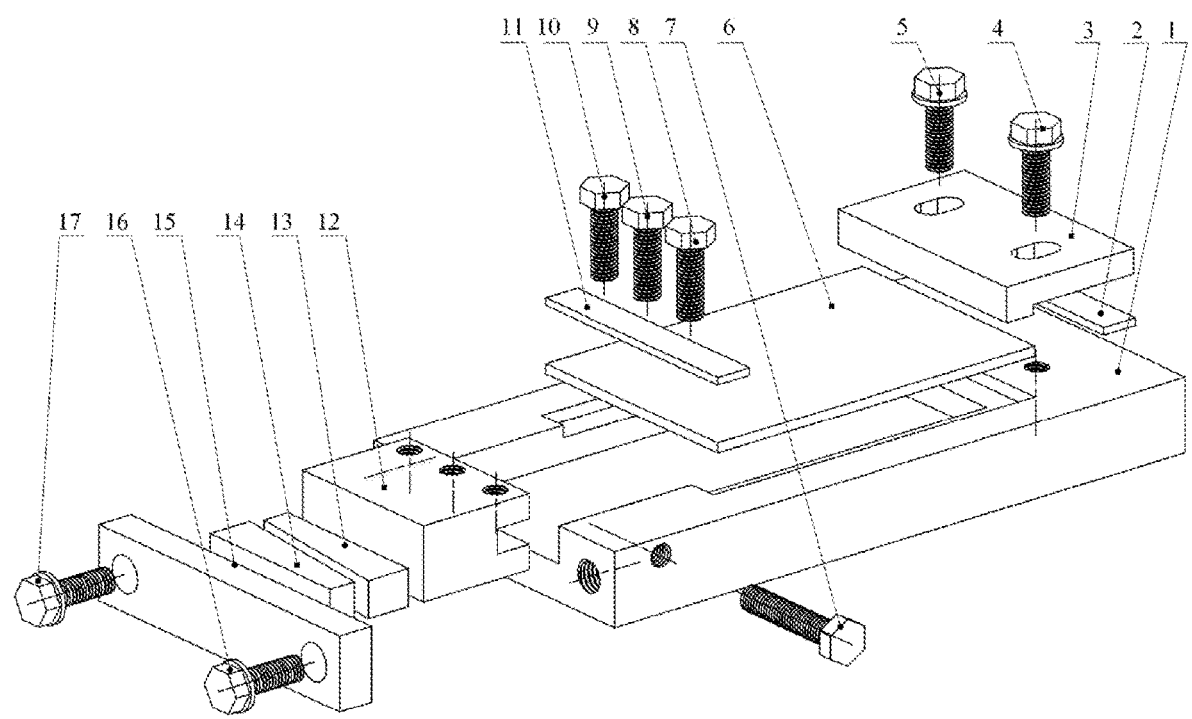
FIG. 1 is an exploded view of an impact test fixture capable of applying preload on a composite laminate according to the present invention.
Figure 2:
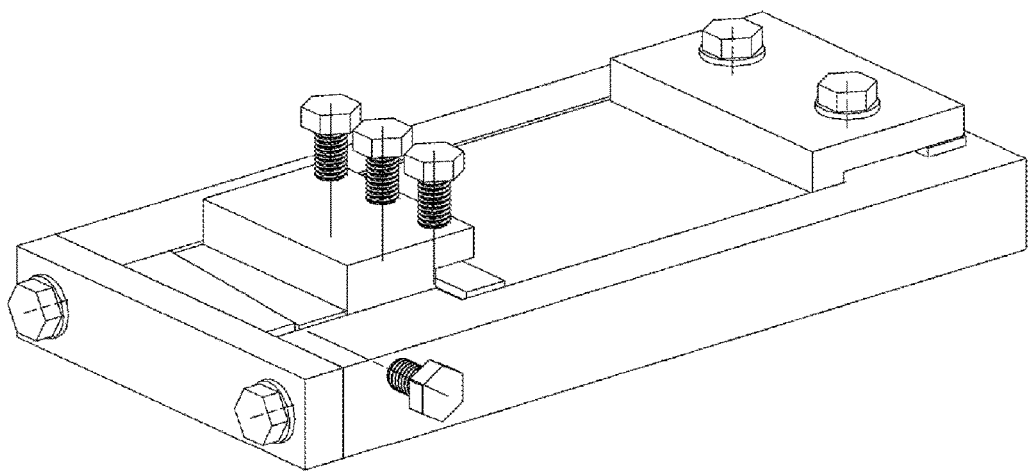
FIG. 2 is a schematic assembly diagram of an overall structure of the present invention.

Referring to FIGS. 1 and 2, the impact test fixture capable of applying preload on a composite laminate in this example is composed of a base 1, a clamping mechanism and a loading mechanism, where the clamping mechanism is positioned on an upper surface of the base 1 and fixedly connected to the base 1 through a bolt, and the loading mechanism is installed at an end of the base. The base 1 has a cuboid structure and is axially provided with a rectangular groove, an end of the base 1 is provided with a sliding groove communicated with one end of the rectangular groove, and the sliding groove and the rectangular groove are positioned coaxially. A pressing block 12 is positioned in the sliding groove at the end of the base 1 and matched with the sliding groove to slide, the end of the base 1 close to both sides of the sliding groove is provided with axial screw holes that are matched with a first fixing bolt 16 and a second fixing bolt 17 to fix a baffle plate 15, the rectangular groove in the base 1 is used for placing a composite laminate 6, the other end of the base 1 is provided with screw holes which are matched with a first press bolt 4 and a second press bolt 5 to mount a pressing plate 3.

In this example, the clamping mechanism includes a first gasket 2, the pressing plate 3, the first press bolt 4, the second press bolt 5, a second gasket 11, the pressing block 12, a third press bolt 8, a fourth press bolt 9 and a fifth press bolt 10, where the pressing plate 3 is a rectangular flat plate, a lower side end of the pressing plate is provided with a transverse boss, the pressing plate 3 is provided with symmetrical through holes, and the pressing plate is connected to the base through the first press bolt 4 and the second press bolt 5. The first gasket 2 is positioned between the pressing plate 3 and the base 1, and the second gasket 11 is positioned between the pressing block 12 and the composite laminate 6; and the second gasket 11 is used for ensuring that a pressing force is uniformly applied to an end of the composite laminate. A side end face of the pressing block 12 is provided with a groove, threaded through holes are evenly distributed in an upper portion of the pressing block 12 at the same side as the groove and used for clamping the end of the composite laminate 6, and the composite laminate is fixed on the base 1 through the first press bolt 4, the second press bolt 5, the third press bolt 8, the fourth press bolt 9 and the fifth press bolt 10.

The loading mechanism includes a loading bolt 7, a first wedge block 13, a second wedge block 14, the baffle plate 15, the first fixing bolt 16 and the second fixing bolt 17, where the first wedge block 13 and the second wedge block 14 are positioned in the sliding groove in the base between the pressing block 12 and the baffle plate 15, and inclined planes of the two wedge blocks are oppositely installed to ensure a greater pressing force. The baffle plate 15 is matched with the base 1 through the first fixing bolt 16 and the second fixing bolt 17, the loading bolt 7 passes through the screw hole at the side end of the base 1 and is matched with a large end face of the first wedge block 13, and different preloads are applied to the composite laminate by rotating the loading bolt 7. The first wedge block 13 and the second wedge block 14 have an identical structure, and inclined plane angles of two wedges of the first wedge block 13 and the second wedge block 14 are 10°.

The impact test fixture capable of applying preload on a composite laminate in this example has the following assembly and loading process.

The composite laminate 6 is placed in a rectangular groove, the pressing block 12 and the second gasket 11 are installed, and the third press bolt 8, the fourth press bolt 9 and the fifth press bolt 10 are tightened. The first gasket 2 and the pressing plate 3 are installed, and the first press bolt 4 and the second press bolt 5 are tightened. The first wedge block 13 has the same structural shape as the second wedge block 14. The first wedge block 13 is placed in the sliding groove at the end of the base 1, and the plane of the first wedge block 13 is in contact with the end face of the pressing block 12. The second wedge block 14 is placed in the sliding groove at the end of the base 1, and the inclined surface of the second wedge block 14 is in contact with the inclined surface of the first wedge block 13. The second wedge block 14 is completely positioned by the baffle plate 15 and the base 1. The baffle plate 15 is mounted on the base 1 through the first fixing bolt 16 and the second fixing bolt 17. Different preloads can be uniformly applied to the composite laminate 6 by tightening and adjusting the tightening torque of the loading bolt 7. The impact test fixture can ensure a stable function of clamping the composite laminate in the impact test process and change the applied preload load by adjusting the tightening torque of the loading bolt. The fixture has a simple structure and reliable action.

What is claimed is:

1. An impact test fixture capable of applying preload on a composite laminate, comprising a base, a clamping mechanism and a loading mechanism, wherein the clamping mechanism is positioned on an upper surface of the base and fixedly connected to the base through a bolt, and the loading mechanism is installed at an end of the base;

the base has a cuboid structure and is axially provided with a rectangular groove, an end of the base is provided with a sliding groove communicated with one end of the rectangular groove, the sliding groove and the rectangular groove are positioned coaxially, a pressing block is positioned in the sliding groove at the end of the base and matched with the sliding groove to slide, the base end close to both sides of the sliding groove is provided with axial screw holes that are matched with a first fixing bolt and a second fixing bolt to fix a baffle plate, the rectangular groove in the base is used for placing a composite laminate, the other end of the base is provided with screw holes which are matched with a first press bolt and a second press bolt to mount a pressing plate;

the clamping mechanism comprises a first gasket, the pressing plate, the first press bolt, the second press bolt, a second gasket, the pressing block, a third press bolt, a fourth press bolt and a fifth press bolt, wherein the pressing plate is a rectangular flat plate, a lower side end of the pressing plate is provided with a transverse boss, the pressing plate is provided with symmetrical through holes, the pressing plate is connected to the base through the first press bolt and the second press bolt, the first gasket is positioned between the pressing plate and the base, and the second gasket is positioned between the pressing block and the composite laminate; the second gasket is used for ensuring that a pressing force is uniformly applied to an end of the composite laminate, a side end face of the pressing block is provided with a groove, threaded through holes are evenly distributed in an upper portion of the pressing block at the same side as the groove and used for clamping the end of the composite laminate, and the composite laminate is fixed on the base through the first press bolt, the second press bolt, the third press bolt, the fourth press bolt and the fifth press bolt;

the loading mechanism comprises a loading bolt, a first wedge block, a second wedge block, the baffle plate, the first fixing bolt and the second fixing bolt, wherein the first wedge block and the second wedge block are positioned in the base sliding groove between the pressing block and the baffle plate, and inclined planes of the two wedge blocks are oppositely installed to ensure a large pressing force; the baffle plate is matched with the base through the first fixing bolt and the second fixing bolt, the loading bolt passes through the screw hole at the side end of the base and is matched with the first wedge block, and different preloads are applied to the composite laminate by rotating the loading bolt.

2. The impact test fixture capable of applying preload on a composite laminate according to claim 1, wherein the first wedge block and the second wedge block have an identical structure, and inclined plane angles of the two wedge blocks are 10°.

* * * * *